US006741384B1

(12) United States Patent
Martin et al.

(10) Patent No.: US 6,741,384 B1
(45) Date of Patent: May 25, 2004

(54) CONTROL OF MEMS AND LIGHT MODULATOR ARRAYS

(75) Inventors: Eric T. Martin, Corvallis, OR (US); Arthur Piehl, Corvallis, OR (US); James R. Przybyla, Corvallis, OR (US); Adam L Ghozeil, Corvallis, OR (US); Peter J. Fricke, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/429,144

(22) Filed: Apr. 30, 2003

(51) Int. Cl.[7] .............................................. G02B 26/00
(52) U.S. Cl. ...................................... 359/291; 359/298
(58) Field of Search ................................ 359/291, 298, 359/315, 579, 584; 345/84, 85

(56) References Cited

U.S. PATENT DOCUMENTS

| | | | | |
|---|---|---|---|---|
| 4,615,595 A | | 10/1986 | Hornbeck | |
| 5,028,939 A | | 7/1991 | Hornbeck et al. | |
| 5,254,980 A | | 10/1993 | Hendrix et al. | |
| 5,610,624 A | | 3/1997 | Bhuva | |
| 5,835,255 A | | 11/1998 | Miles | |
| 6,040,937 A | | 3/2000 | Miles | |
| 6,055,090 A | | 4/2000 | Miles | |
| 6,310,591 B1 | | 10/2001 | Morgan et al. | |
| 2003/0184844 A1 | * | 10/2003 | Yazdi et al. | 359/298 |

* cited by examiner

*Primary Examiner*—Scott J. Sugarman
*Assistant Examiner*—Richard Hanig

(57) ABSTRACT

An array of MEMS devices having column lines and row lines, such as a light modulator array, is controlled in response to an input signal by providing a number of discrete voltages, multiplexing from the discrete voltages a selected voltage to be applied to each MEMS device of the array, and enabling application of the selected discrete voltage to each MEMS device of the array.

27 Claims, 3 Drawing Sheets

CONTROL OF MEMS AND LIGHT MODULATOR ARRAYS

TECHNICAL FIELD

This invention relates to control of analog MEMS arrays and more particularly to analog voltage control of light modulator arrays.

BACKGROUND

Light modulator arrays using binary digital control of each pixel cell have found applications in monochrome text displays and projectors. In order to produce grayscale and color, it is desirable to control each pixel cell with analog signals rather than simple binary control. For achieving high resolution color or grayscale in light-modulator array systems, two methods commonly considered are pulse-width modulation and direct analog control of modulator elements. Using pulse-width modulation requires separating a single frame cycle into multiple cycle segments and sending data for each modulator element during each cycle segment. For large arrays and high resolution, this can require very high data rates. In the light projector industry, significant effort has been expended towards the goal of finding a means to decrease these data rates while maintaining a desired color resolution. For an array of MEMS devices such as light modulation elements (e.g., micro-mirrors, diffraction-based modulators or interference-based modulators), or of LCD modulators, analog control of the voltage driving the modulator may also be desired to produce grayscale and color. Putting full analog control under each cell of the array can negatively affect light modulation system performance and/or cost. Analog circuitry is area-expensive in integrated circuit processes, and analog control of individual cells may require an increase in cell size, resulting in a decrease in spatial resolution of the modulator array. In an effort to maintain cell size, a fabrication process with higher lithographic resolution and smaller feature sizes may be used, resulting in higher costs. Reliability may also be negatively affected by replication of analog control circuitry at every pixel cell of a light-modulator array.

BRIEF DESCRIPTION OF THE DRAWINGS

The features and advantages of the invention will be appreciated readily by persons skilled in the art from the following detailed description when read in conjunction with the drawings, wherein.

DETAILED DESCRIPTION OF EMBODIMENTS

Throughout this specification and the appended claims, the term "MEMS" has its conventional meaning of a micro-electro-mechanical system. The invention may be applied to arrays comprising many kinds of MEMS devices. For clarity and specificity, the embodiments described in detail are described in terms of light modulator arrays in which the MEMS devices are modulator pixel cells. These embodiments illustrate principles and practices in accordance with the invention that may also be applied to other analog-controllable MEMS devices.

The present invention provides the benefits of individual addressability of cells at multiple driving voltages without the overhead of analog control circuitry replicated at each pixel cell. A light modulator array having column lines and row lines is controlled in response to an input signal by providing a number of discrete voltages, multiplexing from the discrete voltages a selected voltage to be applied to each pixel of the array, and enabling application of the selected discrete voltage to each pixel of the array.

The embodiments described in detail below illustrate methods for voltage control of cells in an array of light modulation elements, such as a micro-mirror array, or diffraction-based modulators or interference-based modulation array. The analog control circuitry is put at a boundary of the array, eliminating the necessity for replication of analog control circuitry at the pixel-cell level. The addressing scheme allows for multiplexing of appropriate voltage levels to individual cells.

Figure 1:
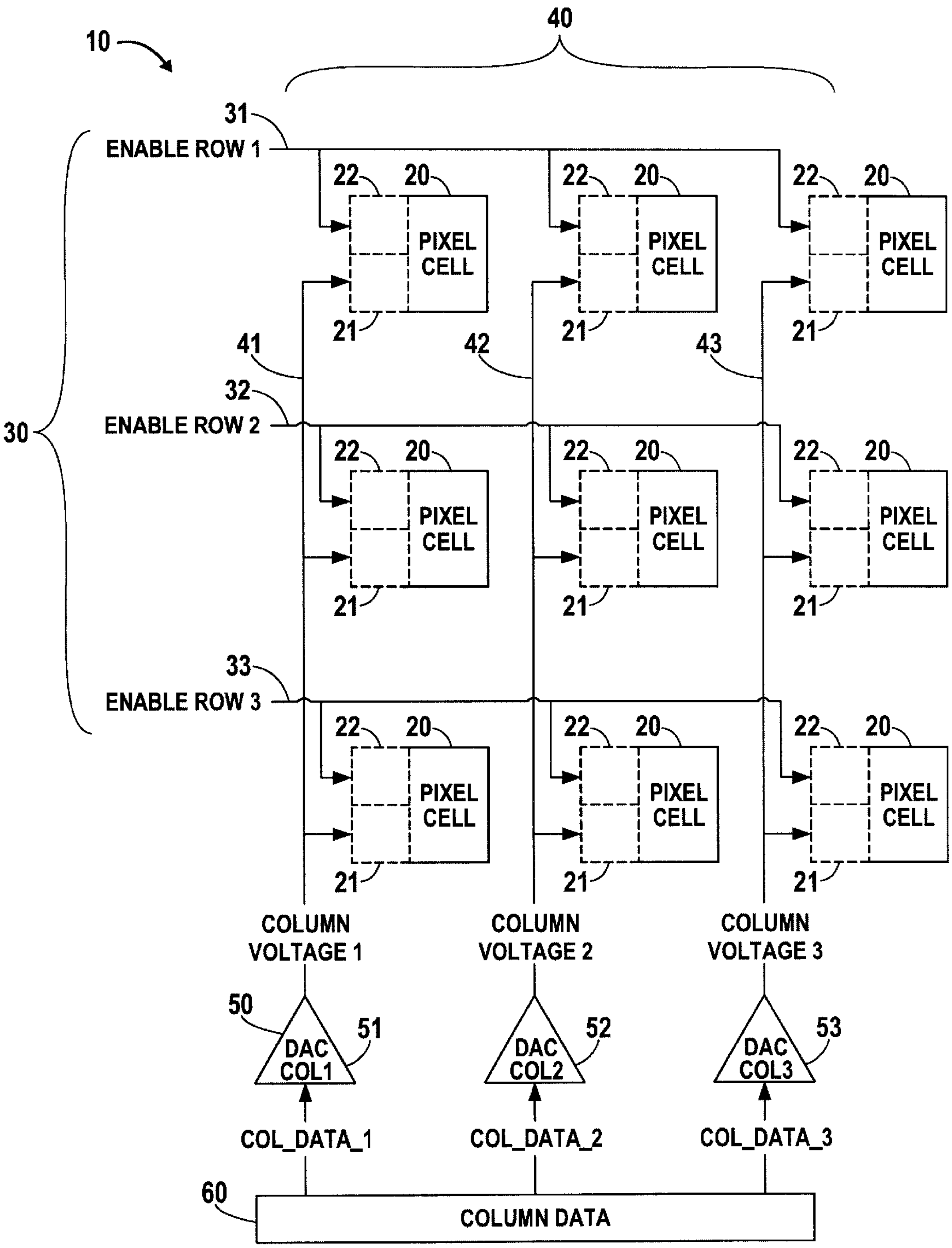
FIG. 1 is a schematic diagram of a first embodiment of a light modulator array control made in accordance with the invention.

FIG. 1 is a schematic diagram of a first embodiment of a light modulator array 10 controlled in accordance with the invention. While this example shows a simple light modulator array 10 having only nine pixel cells 20 in a 3×3 square array, it will be understood that a light modulator array will have many pixel cells arranged in a convenient configuration such as a rectangular array in which each pixel cell is addressed by a row 30 and a column 40. In FIG. 1, Row 1 is identified by reference numeral 31, Row 2 by reference numeral 32, and Row 3 by reference numeral 33. Similarly, Column 1 is identified by reference numeral 41, Column 2 by reference numeral 42, and Column 3 by reference numeral 43. Each pixel cell 20 has a $V_{in}$ input 21 and an ENABLE input 22.

A number of voltage control devices 50 generate a range of analog voltages that are wired to each column voltage select block. In the embodiment shown in FIG. 1, voltage control devices 50 are digital-to-analog converters (DAC's) 51, 52, and 53. The column data 60 for the array controls the voltage select bus for each column. The number of bits of digital signal required at the inputs of the DAC's 51–53 is determined by the number of different analog voltages desired. The row data for the array is similar to that of a conventional binary-driven array. The row data acts as an ENABLE signal for driving the selected column voltage for the selected modulator pixel cell 20.

Figure 2:
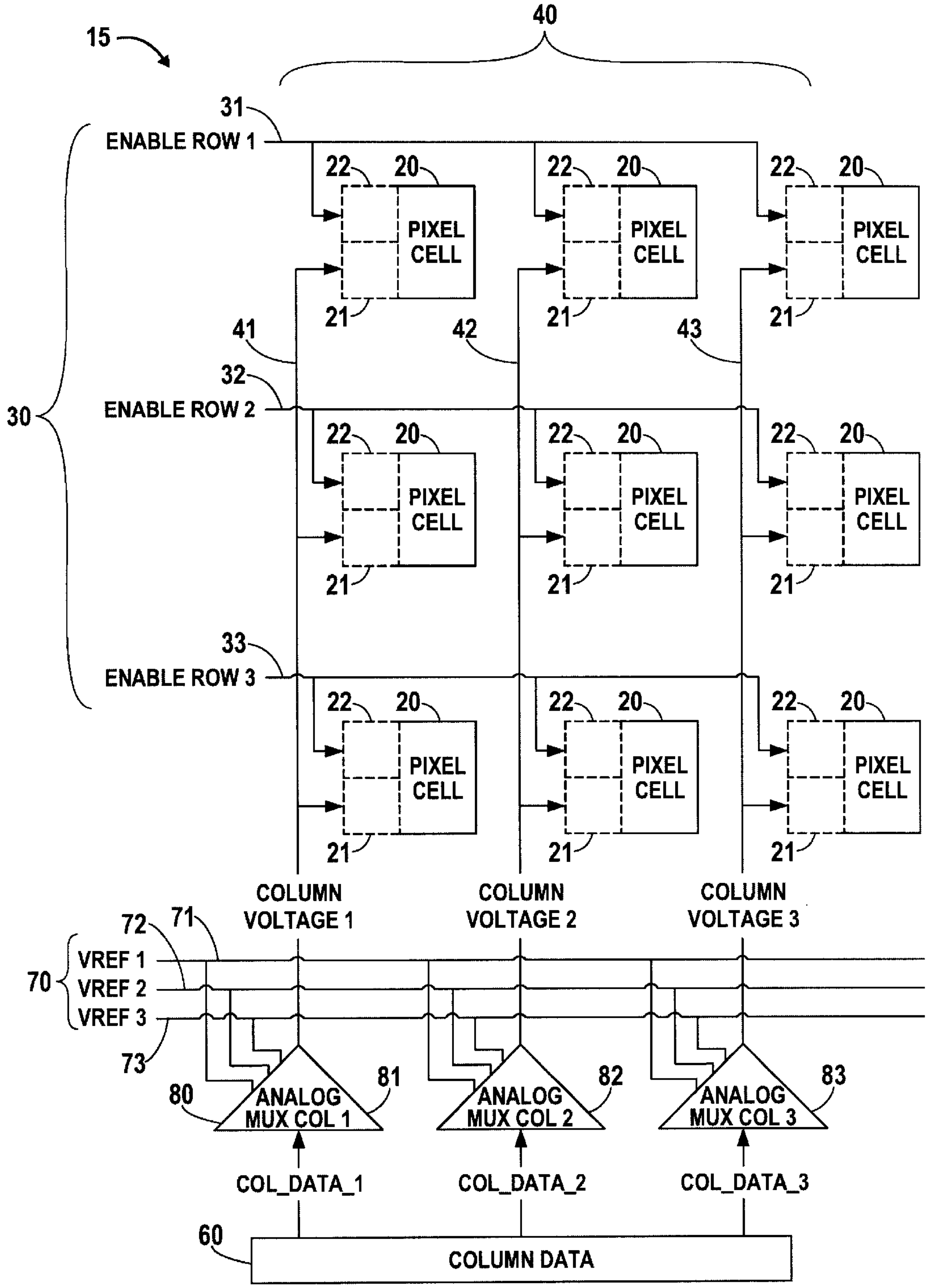
FIG. 2 is a schematic diagram of a second embodiment of a light modulator array control made in accordance with the invention.

FIG. 2 is a schematic diagram of a second embodiment 15 of a light modulator array controlled in accordance with the invention. In FIG. 2, Rows 1–3 are again identified by reference numerals 31–33, and Columns 1–3 are again identified by reference numerals 41–43 respectively. Again, as in FIG. 1, each pixel cell 20 has a voltage $V_{in}$ input 21 and an ENABLE input 22.

In the embodiment of FIG. 2, a number of discrete analog reference voltages 70 are provided, such as $Vref_1$ 71, $Vref_2$ 72, and $Vref_3$ 73. A set of analog multiplexers (MUX's) 80 select an analog reference voltage for each column, in accordance with column data 60. For example, analog MUX 81 selects an analog voltage from among $Vref_1$ 71, $Vref_2$ 72, and $Vref_3$ 73 to apply to the Column 1 bus 41. Similarly, analog MUX 82 selects an analog voltage from the same set of analog reference voltages to apply to the Column 2 bus 42, and analog MUX 83 selects an analog voltage from the same set of analog reference voltages to apply to the Column 3 bus 43. As in FIG. 1, the row data acts as an ENABLE signal for driving the selected column voltage $V_{in}$ for the selected modulator pixel cell 20.

Programmable analog reference voltages 70 such as $Vref_1$ 71, $Vref_2$ 72, and $Vref_3$ 73 may be generated by a single set of conventional DAC's (not shown) for the whole light modulator array 15, using a DAC for each of the discrete analog reference voltages 71–73. Those skilled in the art will recognize that the number of discrete analog reference voltages is not limited to the three illustrated in FIG. 2 and that any desired number of discrete analog reference voltages may be employed.

Figure 3:
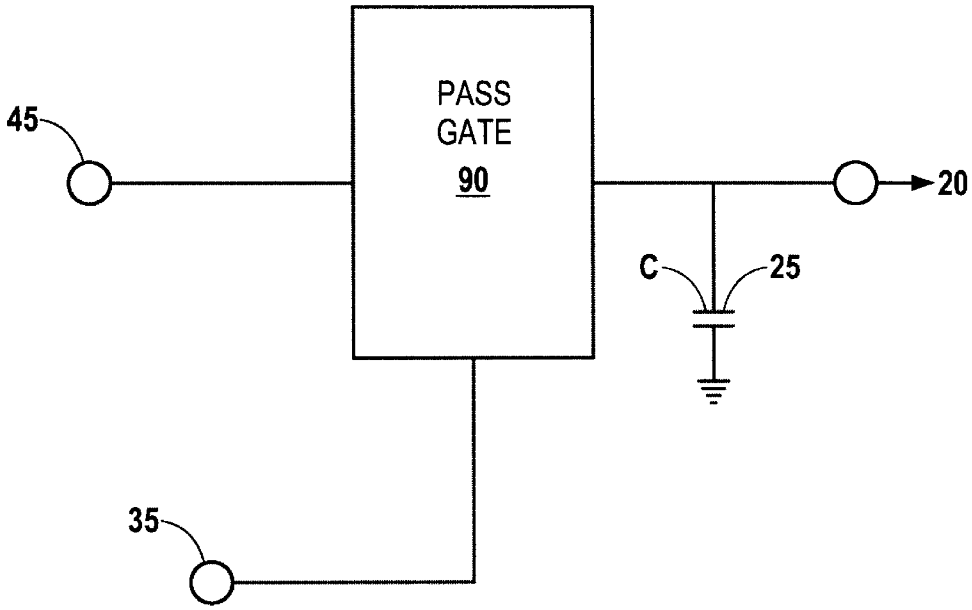
FIG. 3 is a schematic block diagram of drive circuitry for a voltage-driven MEMS element.

FIG. 3 shows, in a simple schematic block diagram, drive circuitry for a voltage-driven MEMS element such as a light-modulation pixel element, illustrating how voltage $V_{in}$ input 21 and ENABLE input 22 are implemented at each pixel cell 20. A single pass gate 90 gated by a row ENABLE signal 35 drives the selected $V_{in}$ voltage input 45 to be applied to the modulator pixel cell 20. A capacitor 25 may be used to hold the applied analog voltage $V_{in}$ if needed, or pixel cell 20 may have a built-in capacitance C, obviating the need for a separate capacitor 25.

Thus, both of the embodiments of FIGS. 1 and 2 utilize a number of voltage control elements 50 or 80 respectively to generate a desired range of discrete analog voltages. The discrete analog voltages are then multiplexed onto the column lines of the modulator array. Multiplexing any one of a given range of voltages to an individual pixel cell, as opposed to generating an analog voltage level at each cell, enables improved color resolution with a minimal increase in data rates.

Multiplexing any one of a given range of voltages to an individual pixel cell can also eliminate the need for more expensive fabrication processes and allow analog control circuitry of a size that can fit under individual pixel elements of the modulator array.

The methods described for controlling both light modulator arrays 10 and 15 include providing a number of discrete analog voltages. The methods described use row lines 30 and column lines 40 for each pixel cell 20 of the array by selecting from the discrete voltages a voltage to be applied to the pixel, applying the selected voltage to the column line, and enabling application of the selected voltage to the pixel by selecting the row line for the pixel. The discrete voltages provided are analog reference voltages that may be programmed using DAC's, either at each column as in FIG. 1, or for the whole array (or any desired portion of the array) as in FIG. 2. The voltage selection, voltage application, and enabling may be performed substantially simultaneously for all pixels of the light modulator array.

The methods described herein are also applicable for controlling a light modulator array having pixel modulation elements 20 adapted to be responsive to analog voltage signals. One provides a number of row lines 30 and a number of column lines 40, each combination of a particular column line and a particular row line being adapted to select a pixel modulation element of the array, and a number of discrete analog voltages 70. For each pixel of the array, a voltage to be applied to the pixel is selected from among the discrete analog voltages 70. The selected voltage is applied to the column line of the pixel, and application of the selected voltage to the pixel is enabled by selecting the row line for the pixel. Or, in an equivalent alternative scheme, the selected voltage is applied to the row line of the pixel, and application of the selected voltage to the pixel is enabled by selecting the column line for the pixel. Again, the voltage selection, the voltage application, and the enabling may be performed for all pixels of the light modulator array substantially simultaneously. In the context of pixel modulation elements 20 that are responsive to analog voltage signals, each discrete voltage may correspond to a gray level or to a unique combination of hue, saturation, and intensity of color, for example.

Another aspect of the present invention is apparatus for controlling a light modulator array in response to an input signal. The light modulator array 10 or 15 has row lines 30 and column lines 40 for selecting a pixel cell 20 of the array. The apparatus includes a number of discrete voltage sources, a multiplexer 80 responsive to the input signal for multiplexing from the discrete voltage sources a selected voltage to be applied to each pixel of the array, and one or more gates 90 for enabling application of the selected discrete voltage to each pixel cell 20 of the array. Each discrete voltage source may be a digital-to-analog converter (DAC). If necessary to hold a charge corresponding to the selected analog voltage, the apparatus may include a capacitor 25 coupled to gate 90. Gate 90 may be controlled by a row line 30 or alternatively by a column line 40.

To perform the multiplexing function, a number of voltage select blocks may be used, each voltage select block being coupled to a column line 40 if a row line 30 controls gate 90, or alternatively to a row line 30 if a column line 30 controls gate 90.

Thus, the invention provides methods and apparatus for controlling a light-modulator array having a plurality of pixels. The controller apparatus provides a number of discrete analog voltages, selects from among the discrete analog voltages a particular analog voltage to be applied to each pixel, and applies the selected analog voltage to each selected pixel. Gating the application of the selected analog voltage to each pixel is also provided by the apparatus. Multiplexing of the analog voltages is integrated with row/column addressing of the light-modulator array.

INDUSTRIAL APPLICABILITY

The methods and apparatus of the invention are useful for control of many kinds of analog-controllable MEMS device arrays, light modulator arrays and light projectors, such as micro-mirrors, diffraction-based modulators or interference-based modulators, and for control of liquid-crystal (LCD) modulators.

Although the foregoing has been a description and illustration of specific embodiments of the invention, various modifications and changes thereto can be made by persons skilled in the art without departing from the scope and spirit of the invention as defined by the following claims. For example, those skilled in the art will recognize that the roles of row and column lines may be reversed from those in the embodiments illustrated. In such a method, a number of discrete voltages are provided and, for each pixel of the array, a voltage to be applied to the pixel is selected from the discrete voltages, the selected voltage is applied to the row line of the pixel, and application of the selected voltage to the pixel is enabled by selecting the column line for the pixel.

Also, those skilled in the art will recognize that the voltage control described may also be used in conjunction with conventional pulse-width modulation, enabling improved color resolution with a minimal increase in required data rate. For example, if two analog voltages are used (e.g., 1 V and 2 V), and two bits of pulse-width data are used (four possible duty cycles), then eight levels of intensity can be achieved.

What is claimed is:

1. A method for controlling, in response to an input signal, an array of MEMS devices of the type having column lines and row lines for selecting a particular MEMS device of the array, the method comprising the steps of:

a) providing a number of discrete voltages; and b) responsive to the input signal, multiplexing from the discrete voltages a selected discrete voltage to be applied to each MEMS device of the array; and c) enabling application of the selected discrete voltage to each MEMS device of the array.

2. The method of claim 1, wherein the discrete voltages are analog reference voltages.

3. The method of claim 1, wherein each MEMS device of the array comprises a pixel cell of a light modulator.

4. A method for controlling, in response to an input signal, a light modulator array of the type having column lines and row lines for selecting a pixel of the array, the method comprising the steps of:

a) providing a number of discrete voltages; and b) responsive to the input signal, multiplexing from the discrete voltages a selected discrete voltage to be applied to each pixel of the array; and c) enabling application of the selected discrete voltage to each pixel of the array.

5. The method of claim 4, wherein the discrete voltages are analog reference voltages.

6. A method for controlling, in response to an input signal, a light modulator array of the type having column lines and row lines for selecting a pixel of the array, the method comprising the steps of:

a) providing a number of discrete voltages; and for each pixel of the array, b) selecting from the discrete voltages a voltage to be applied to the pixel;

c) applying the selected voltage to the column line of the pixel; and d) enabling application of the selected voltage to the pixel by selecting the row line for the pixel.

7. The method of claim 6, wherein the discrete voltages are analog reference voltages.

8. The method of claim 6, wherein the voltage-selecting step b), the voltage-applying step c), and the enabling step d) are performed for all pixels of the light modulator array substantially simultaneously.

9. A method for controlling, in response to an input signal, a light modulator array of the type having column lines and row lines for selecting a pixel of the array, the method comprising the steps of:

a) providing a number of discrete voltages; and for each pixel of the array, b) selecting from the discrete voltages a voltage to be applied to the pixel;

c) applying the selected voltage to the row line of the pixel; and d) enabling application of the selected voltage to the pixel by selecting the column line for the pixel.

10. The method of claim 9, wherein the discrete voltages are analog reference voltages.

11. The method of claim 9, wherein the voltage-selecting step b), the voltage-applying step c), and the enabling step d) are performed for all pixels of the light modulator array substantially simultaneously.

12. A method for controlling a light modulator array having pixel modulation elements adapted to be responsive to analog voltage signals, the method comprising the steps of:

a) providing a number of column lines and a number of row lines, each combination of a column line and a row line being adapted to select a pixel;

b) providing a number of discrete voltages; and for each pixel of the array, c) selecting from the discrete voltages a voltage to be applied to the pixel;

d) applying the selected voltage to the column line of the pixel; and e) enabling application of the selected voltage to the pixel by selecting the row line for the pixel.

13. The method of claim 12, wherein the voltage-selecting step c), the voltage-applying step d), and the enabling step e) are performed for all pixels of the light modulator array substantially simultaneously.

14. The method of claim 12, wherein each discrete voltage corresponds to a gray level.

15. The method of claim 12, wherein each discrete voltage corresponds to a unique combination of hue, saturation, and intensity of color.

16. Apparatus for controlling, in response to an input signal, a light modulator array of the type having column lines and row lines for selecting a pixel of the array, the apparatus comprising:

a) a number of discrete voltage sources;

b) a multiplexer responsive to the input signal for multiplexing from the discrete voltage sources a selected voltage to be applied to each pixel of the array; and c) one or more gates for enabling application of the selected discrete voltage to each pixel of the array.

17. The apparatus of claim 16, further comprising a capacitor coupled to the gate.

18. The apparatus of claim 16, wherein the gate is controlled by a row line.

19. The apparatus of claim 16, further comprising a plurality of voltage select blocks, each voltage select block being coupled to a column line.

20. The apparatus of claim 16, wherein the gate is controlled by a column line.

21. The apparatus of claim 16, further comprising a plurality of voltage select blocks, each voltage select block being coupled to a row line.

22. The apparatus of claim 16, wherein each discrete voltage source is a digital-to-analog converter (DAC).

23. Apparatus for controlling, in response to an input signal, a light modulator array of the type having column lines and row lines for selecting a pixel of the array, the apparatus comprising:

a) a number of discrete voltage sources;

b) a multiplexer responsive to the input signal for multiplexing from the discrete voltage sources a selected voltage to be applied to each pixel of the array, the multiplexer comprising a plurality of voltage select blocks, each voltage select block being coupled to a column line; and c) a plurality of gates for enabling application of the selected discrete voltage to each pixel of the array, each gate being coupled to a row line.

24. Apparatus for controlling, in response to an input signal, a light modulator array of the type having column lines and row lines for selecting a pixel of the array, the apparatus comprising:

a) a number of discrete voltage sources;

b) a multiplexer responsive to the input signal for multiplexing from the discrete voltage sources a selected voltage to be applied to each pixel of the array, the multiplexer comprising a plurality of voltage select blocks, each voltage select block being coupled to a row line; and c) a plurality of gates for enabling application of the selected discrete voltage to each pixel of the array, each gate being coupled to a column line.

25. A controller for a light-modulator array having a plurality of MEMS devices, the controller comprising:

a) means for providing a number of discrete analog voltages;

b) means for selecting from the discrete voltages an analog voltage to be applied to each MEMS device; and c) means for applying the selected analog voltage to each MEMS device.

26. The controller of claim 25, further comprising:

d) means for gating application of the selected analog voltage to each MEMS device.

27. The controller of claim 25, wherein each MEMS device of the array comprises a pixel cell of a light modulator.

* * * * *